United States Patent [19]

Shimoichi et al.

[11] Patent Number: 5,277,687
[45] Date of Patent: Jan. 11, 1994

[54] PRESS TOOL INTERCHANGING APPARATUS

[75] Inventors: Kouji Shimoichi; Yukio Nobutou, both of Hiroshima, Japan

[73] Assignee: Hirotec Corporation, Hiroshima, Japan

[21] Appl. No.: 966,749

[22] Filed: Oct. 27, 1992

[30] Foreign Application Priority Data

Mar. 31, 1992 [JP] Japan ............................ 4-028136[U]

[51] Int. Cl.⁵ ................... B23Q 3/155; B21J 13/00; B30B 15/06
[52] U.S. Cl. .......................... 483/28; 72/446; 72/448; 100/229 R; 100/918
[58] Field of Search ................... 483/28, 29; 72/446, 72/448, 442; 100/224, 918, 229 R

[56] References Cited

U.S. PATENT DOCUMENTS

| | | | |
|---|---|---|---|
| 3,841,142 | 10/1974 | Aisuta et al. | 72/448 |
| 3,910,180 | 10/1975 | Yasuhara et al. | 100/224 |
| 4,152,978 | 5/1979 | Abe et al. | 100/225 R X |
| 4,408,521 | 10/1983 | Schelli et al. | 100/229 R |
| 4,433,670 | 2/1984 | Kiyosawa | 72/446 X |
| 4,614,108 | 9/1986 | Bolle et al. | 72/446 |
| 4,819,554 | 4/1989 | Fleischer et al. | 100/224 |
| 5,129,254 | 7/1992 | Keizer et al. | 72/448 |

FOREIGN PATENT DOCUMENTS

| | | | |
|---|---|---|---|
| 844857 | 6/1970 | Canada | 72/448 |
| 30534 | 2/1985 | Japan | 72/448 |
| 253514 | 12/1985 | Japan | 100/918 |
| 3-57519 | 3/1991 | Japan . | |
| 3-248762 | 11/1991 | Japan . | |
| 3-126233 | 12/1991 | Japan . | |
| 196525 | 5/1967 | U.S.S.R. | 100/918 |

Primary Examiner—William Briggs
Attorney, Agent, or Firm—Longacre & White

[57] ABSTRACT

Herein disclosed is a press tool interchanging apparatus for a press machine, comprising: a tool plate arranged in a press station and including a plurality of tool clamps hydraulically actuated for clamping a press tool; a bolster plate underlying the tool plate and having a plurality of rollers adapted to appear, when lifted, above the upper surface of the bolster plate for carrying the press tool; a plurality of lifters arranged in the bolster plate and hydraulically actuated for lifting the rollers; and a plurality of pressure fluid conduits arranged in the tool plate for feeding a fluid under pressure to the tool clamps and the lifters. Thus, the tool plate is arranged with the tool clamps and the fluid conduits, and the lifters having the vertically movable rollers are mounted in the bolster plate. The pressure fluid can be pumped by jointing couplers in positions between the tool plate and the bolster plate to quicken the clamping actions thereby to shorten the tool interchanging time and to improve the working efficiency of the press machine.

2 Claims, 8 Drawing Sheets

FIG. 8

PRESS TOOL INTERCHANGING APPARATUS

BACKGROUND OF THE INVENTION

1. Field of the Invention

The present invention relates to a tool interchanging apparatus for a press machine and, more particularly, to a press tool interchanging apparatus using a tool plate arranged with pressure fluid conduits.

2. Description of the Prior Art

In the prior art of press working field required to have a multiple-kind little production, it has grown ordinary to interchange press tools ten and more times a day. In order to keep and improve the working efficiency of the press machine, therefore, it is one of important factors to shorten the tool interchanging time. Thus, a variety of tool interchanging apparatus have been devised. In this meanwhile, however, the press facilities are large-sized, and a mere improvement in the existing facilities could not cope with the demand of the field. Many other problems are left unsolved in that the shortening of the tool interchanging time and the spare of the man power are insufficient and ineffective. It is well known in the art, for example, to interchange the tools by moving in and out a tool plate carrying a press tool at a right angle with respect to the work conveying direction or by moving it further in parallel with the work conveying direction (as disclosed in Japanese Patent Laid-Open Nos. 57519, 248762 and 126233/1991). Some of these disclosures uses a self-running truck which is made to run on a pair of rails. However, this tool interchanging apparatus using the self-running truck is required to reinforce the floor, on which are laid the rails, thus inviting an increase in the construction cost.

In case a tool plate carrying a press tool is to be lifted from the bolster plate of a press machine by means of built-in lifters and horizontally conveyed on a roller conveyor, it is also known in the art to use a pusher or a closed loop chain with pawls. On the other hand, an automatic clamp for clamping the press tool and a tool plate or a bolster plate usually uses a hydraulic cylinder. However, pressure fluid conduits for feeding a fluid such as oil under pressure to those lifters or auto clamps are separately arranged by metal tubes or naked high-pressure hoses.

The auto clamps or lifters have to be fed with the pressure fluid so as to position the press tool, which has been moved horizontally or vertically and seated on the stationary bolster plate of a press station, to fix at least the lower tool member on the bolster plate and to move the press tool again.

In the press tool interchanging apparatus of the prior art, however, the operator has to enter the dangerous inside of the press machine, after he has stopped the press machine, to connect the flexible tubes of the fluid conduits of the auto clamps and the tool lifters manually for each interchange. This operation is not only troublesome but also liable to invite leakage of the pressure fluid. Another problem is to take a long time for the connection.

SUMMARY OF THE INVENTION

After earnest and keen investigations, we have found it possible to automate the conduit connection and to solve the above-specified problems by adopting easily removable couplers and by arranging the tool plate in advance with pressure fluid conduits.

It is, therefore, an object of the present invention to shorten the time for interchanging press tools thereby to improve the workability of a press machine.

According to a major feature of the present invention, there is provided a press tool interchanging apparatus for a press machine, which comprises: a tool plate arranged in a press station and including a plurality of tool clamps hydraulically actuated for clamping a press tool; a bolster plate underlying said tool plate and having a plurality of rollers adapted to appear, when lifted, above the upper surface of said bolster plate for carrying said press tool; a plurality of lifters arranged in said bolster plate and hydraulically actuated for lifting said rollers; and a plurality of pressure fluid conduits arranged in said tool plate for feeding a fluid under pressure to said tool clamps and said lifters.

According to another feature of the present invention, the press tool interchanging apparatus further comprises: a shunting station arranged on at least one side of said press station for shunting said press tool; tool transfer means for reciprocating said tool plate carrying said press tool to transfer the same between said shunting station and said press station; means for actuating said tool clamps and said lifters hydraulically; and a plurality of couplers mounted in predetermined positions on said bolster plate for coupling said pressure fluid conduits.

BRIEF DESCRIPTION OF THE DRAWINGS

Other objects and advantages and novel features of the present invention will become apparent from the following description to be made with reference to the accompanying drawings, in which.

DESCRIPTION OF THE PREFERRED EMBODIMENT

The present invention will be described in detail in the following in connection with its embodiment.

Figure 4:
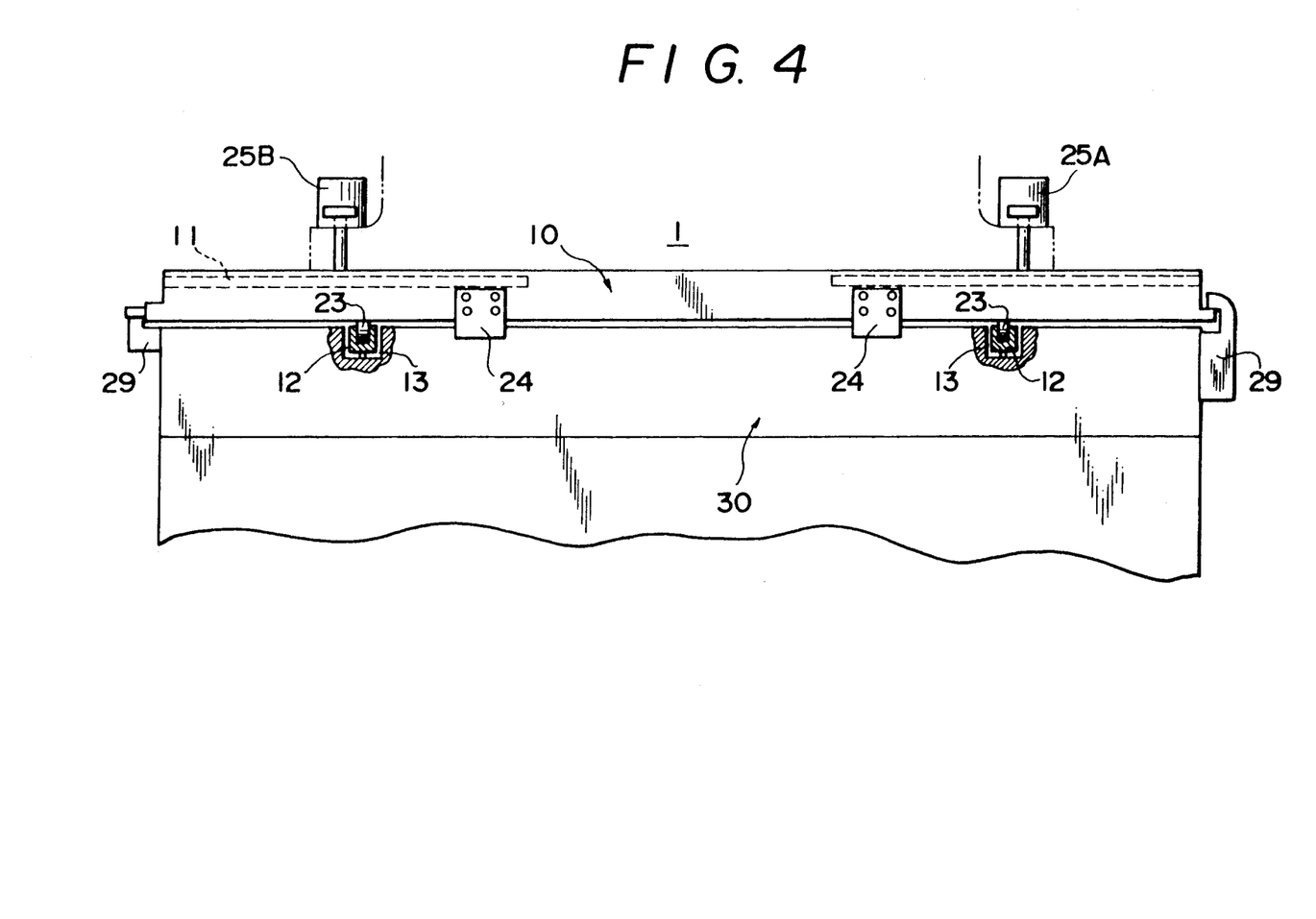
FIG. 4 is a view taken in the direction of arrow A—A of FIG. 3.
Figure 5:
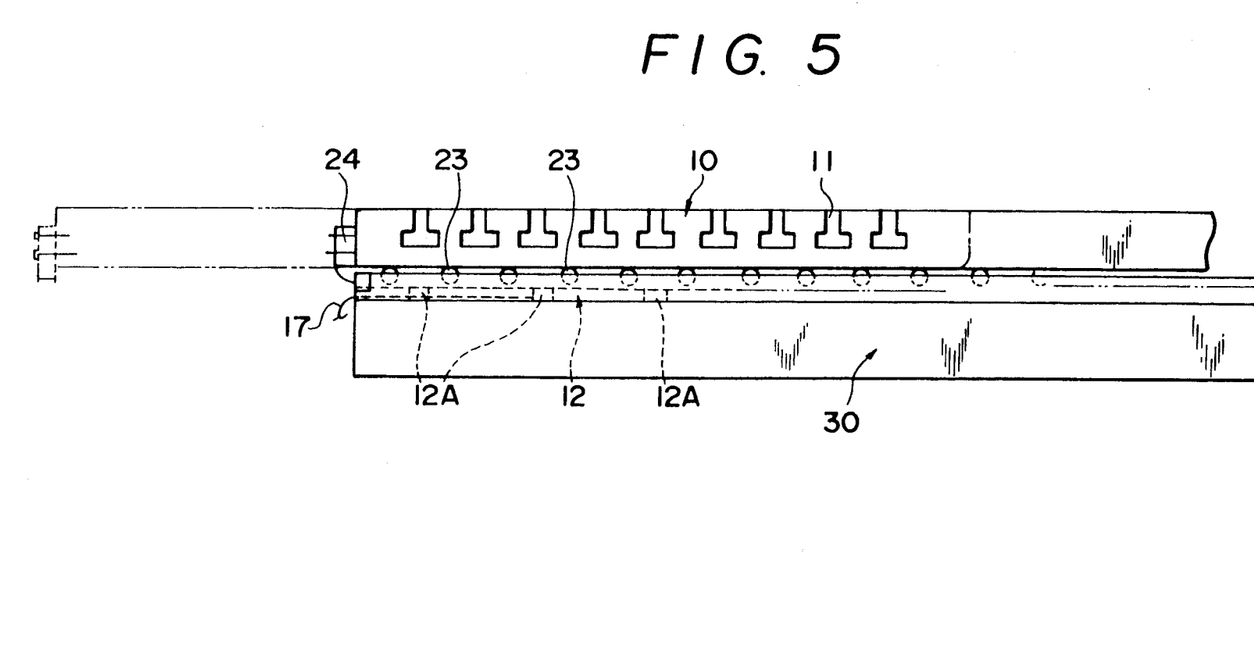
FIG. 5 is a view taken in the direction of arrow B—B of FIG. 3.
Figure 8:
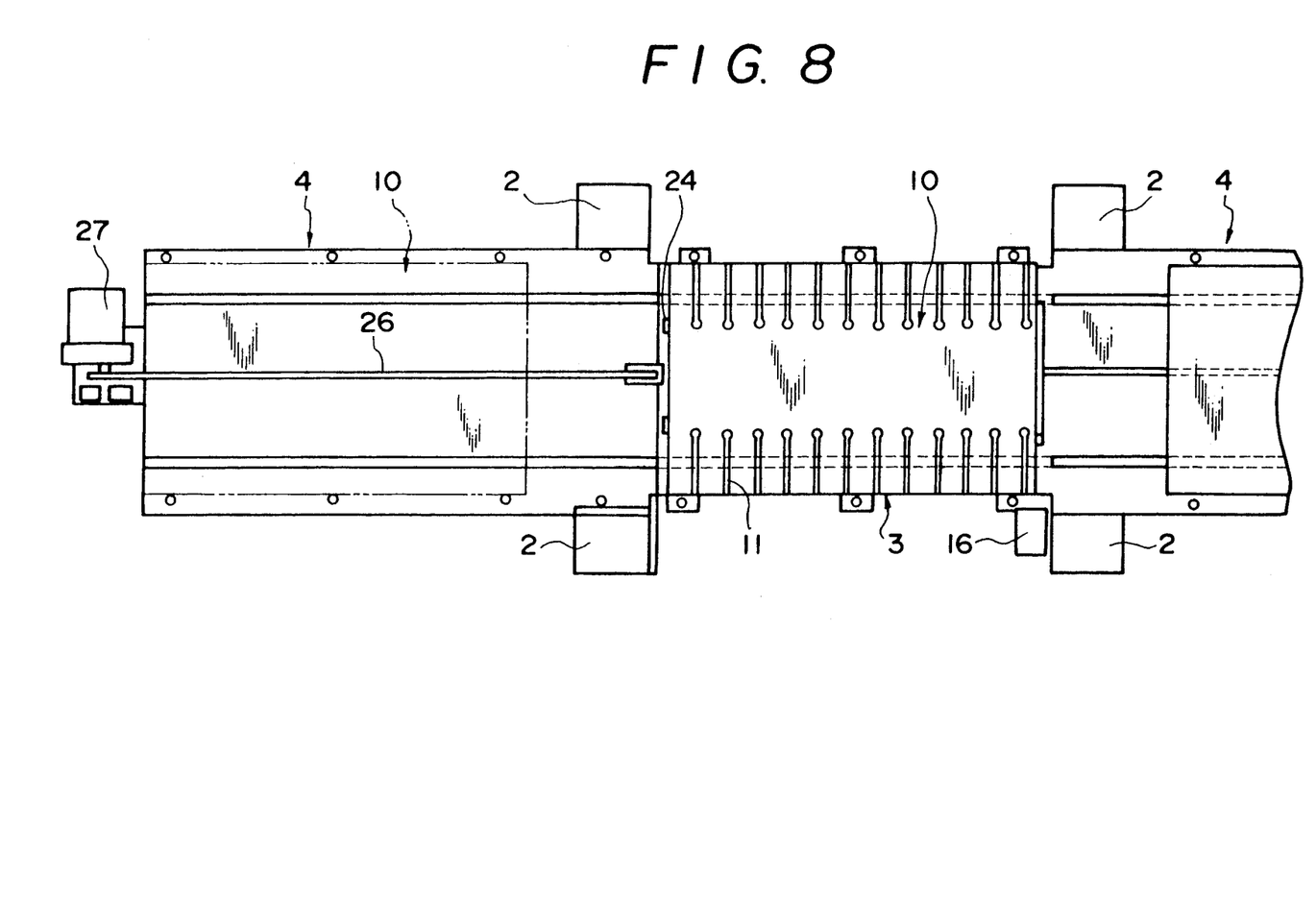
FIG. 8 is a top plan view showing the entirety of embodiment of the press tool interchanging apparatus according to the present invention.
Figure 9:
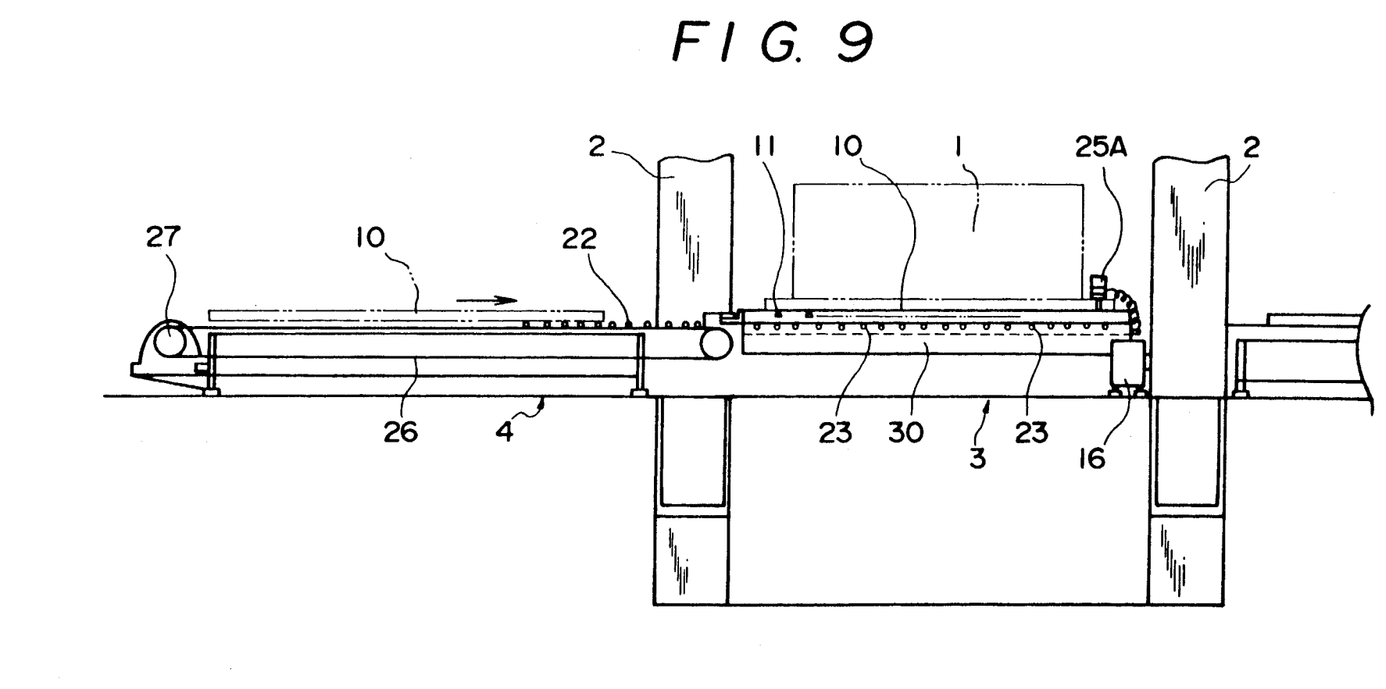
FIG. 9 is a front elevation showing the press tool interchanging apparatus according to the present invention.

Referring at first to FIGS. 8 and 9, there is a press station 3 for a press machine, which is supported at a central portion by four posts 2. Shunting stations 4 are arranged at the lefthand and righthand sides of the press station 3. A press tool 1 (as better seen in FIG. 4) is positioned and carried in advance on a tool plate 10. This tool plate 10 is transferred from the lefthand shunting station 4 to the press station 3 by the action of a closed loop chain 26 which is driven by a chain driving motor 27. At this time, the tool plate 10 is supported at first in the shunting station 4 by a row of numerous paired rollers 22 of fixed axles and is gradually transferred onto a row of vertically movable rollers 23 (as shown in a lifted state) lying on a bolster plate 30. Here, the vertically movable rollers 23 are vertically arranged in a pair of roller grooves 13 (as better seen in FIGS. 3 and 4) of the bolster plate 30 so that they can make appearances to a height of 1 to 10 mm of the appearance of the bolster plate 30. Moreover, the tool plate 10 is stopped in position by the action of stoppers 24 and 24 (as better seen in FIGS. 3 and 4). When the vertically movable rollers descend, the tool plate 10 is accurately positioned and seated on the bolster plate 30 by four positioning pins 14 (as better seen in FIG. 3). At this time, the ascent and descent of the vertically movable rollers 23 in the paired roller grooves 13 which run in parallel with the tool plate moving direction (as better seen in FIGS. 3 and 4) are effected by feeding and interrupting an oil pressure to a plurality of hydraulic cylinders 12A (as better seen in FIG. 5) for lifters 12, which are arranged in the roller grooves 13 in the bolster plate 30.

Figure 7:
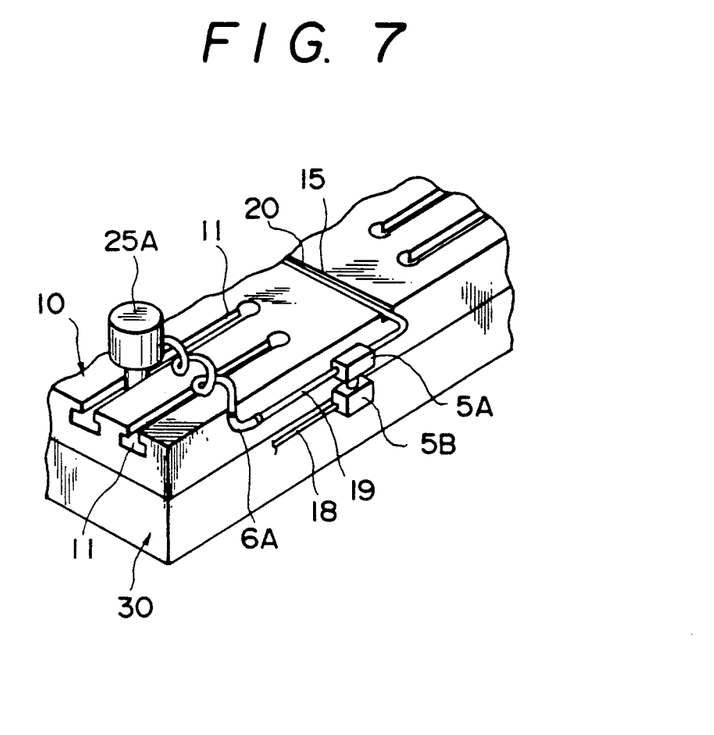
FIG. 7 is a perspective view showing a portion of the tool plate.

The tool plate 10 is further arranged with at least two auto clamps 25A and 25B (as better seen in FIGS. 3, 4, 7 and 9), which are so fitted in T-shaped grooves 11 (which are shaped as in FIGS. 5 and 7) that they can slide when slackened. Thus, the auto clamps 25A and 25B can have their hydraulic cylinders tensed to clamp the press tool 1 fixedly on the tool plate 10 by feeding the oil pressure to themselves.

Figure 1:
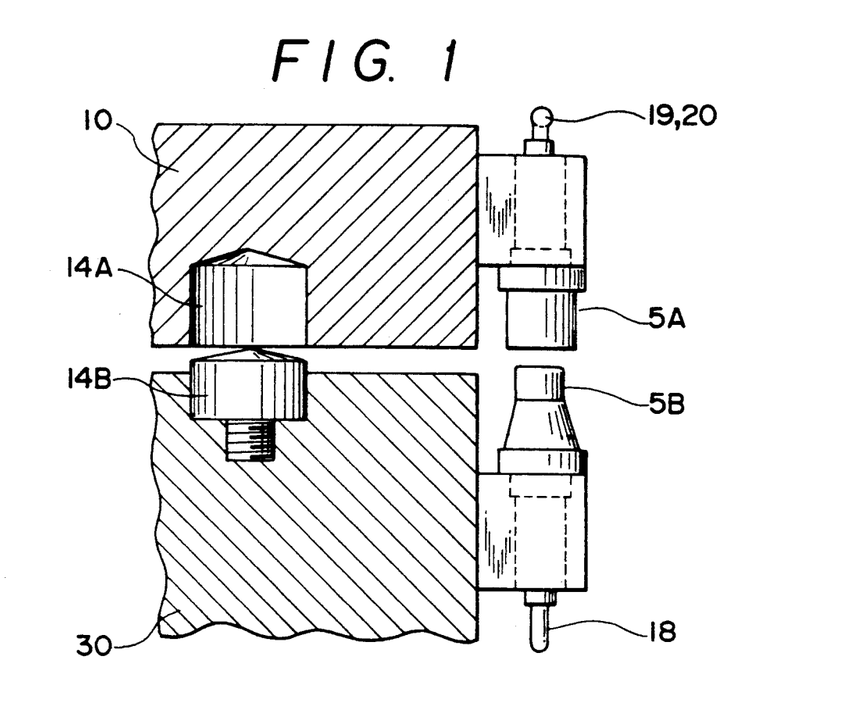
FIG. 1 is a side elevation showing a press tool interchanging apparatus according to the present invention, in which a female coupler portion of a tool plate and a male coupler portion of a bolster plate are separated.
Figure 2:
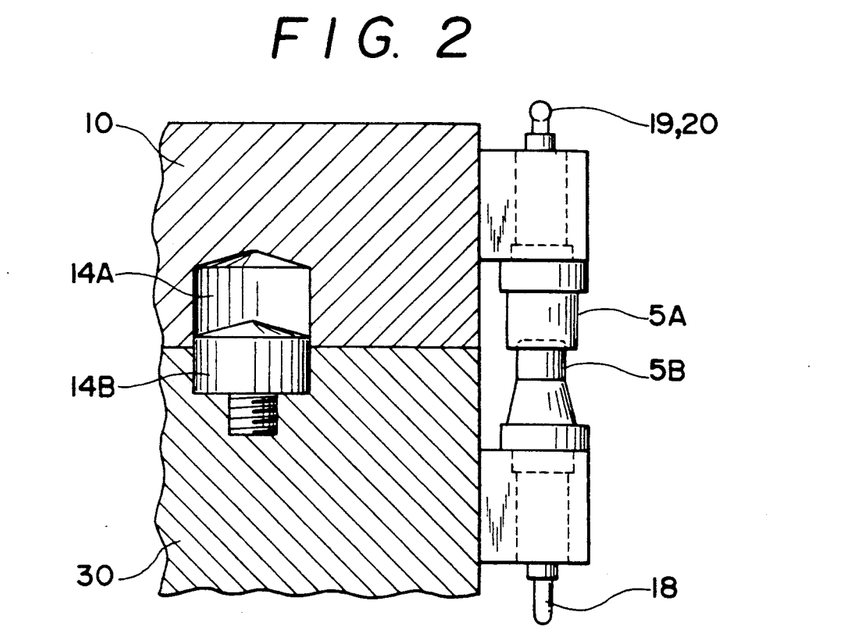
FIG. 2 is a side elevation showing the press tool interchanging apparatus, in which the female coupler portion and the male coupler portion are jointed to each other.

In addition, a female coupler portion 5A is fixed to the front side of the tool plate 10, as shown in FIGS. 1 and 2. To the side of the bolster plate 30 just below the female coupler portion 5A, there is so fixed a male coupler portion 5B by the positioning pins 14 that it may be aligned with the female one 5B (as shown in FIGS. 1 and 2). To the lower portion of the male coupler portion 5B, there is connected an oil conduit 18 which is made of a metal tube and connected on the other hand to an oil pressure source 16 (as better seen in FIG. 3). The coupler portions 5A and 5B constitute a coupler 5 which may be exemplified by one which is registered under the trade name of "Navco Joint". This coupler (or joint) can be freed, when in a separate state, of any leakage of oil pressure by the action of a check valve and can feed, when in a jointed state, the oil under high pressure reliably without the leakage.

Figure 3:
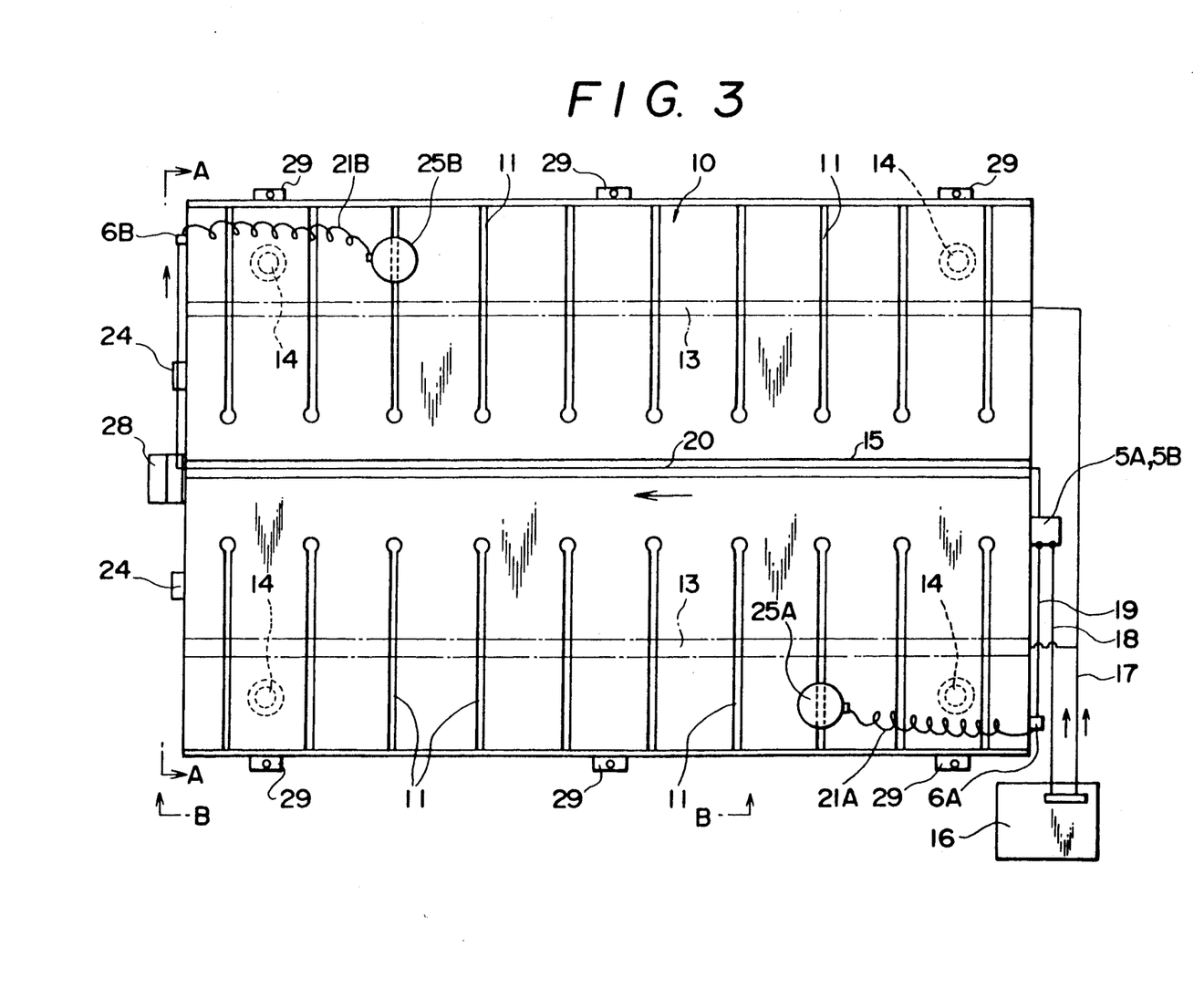
FIG. 3 is a top plan view showing the tool plate.

To the head of the female coupler portion 5A at the side of the tool plate 10, on the other hand, there are connected oil conduits 19 and 20 which are made of metal tubes (as better seen in FIGS. 2 and 3). As shown in FIG. 3, the oil conduit 19 is arranged along the side wall of the tool plate 10 to feed the pressure oil through a swivel joint 6A and a flexible tube 21A to the auto clamp 25A, as located at this side. On the other hand, the coil conduit 20 runs in a center groove 15 and further along the side wall at the stopper 24 to feed the pressure oil through a swivel joint 6B and a flexible tube 21B to the auto clamp 25B which is located in a generally symmetrical position to the auto clamp 25A.

The sequence of feeding the pressure oil from the oil pressure source 16 will be described in the following (with reference to FIG. 6). The oil pressure is fed at first via an oil conduit 17 to the lifter 12 in the bolster pate 30 while the tool plate 10 carrying the press tool 1 remains in the shunting station 4. The pressure oil is then relieved when the tool plate 10 is positioned and seated on the bolster plate 30. Next, the pressure oil is fed to the auto clamp portions 25A and 25B via the oil conduit 18 and the coupler 5. When the used press tool 1 is to be taken out, on the contrary, the pressure oil to the auto clamp is relieved, and the tool lifters 12 are ascended (as better seen in FIGS. 4 and 5).

Figure 6:
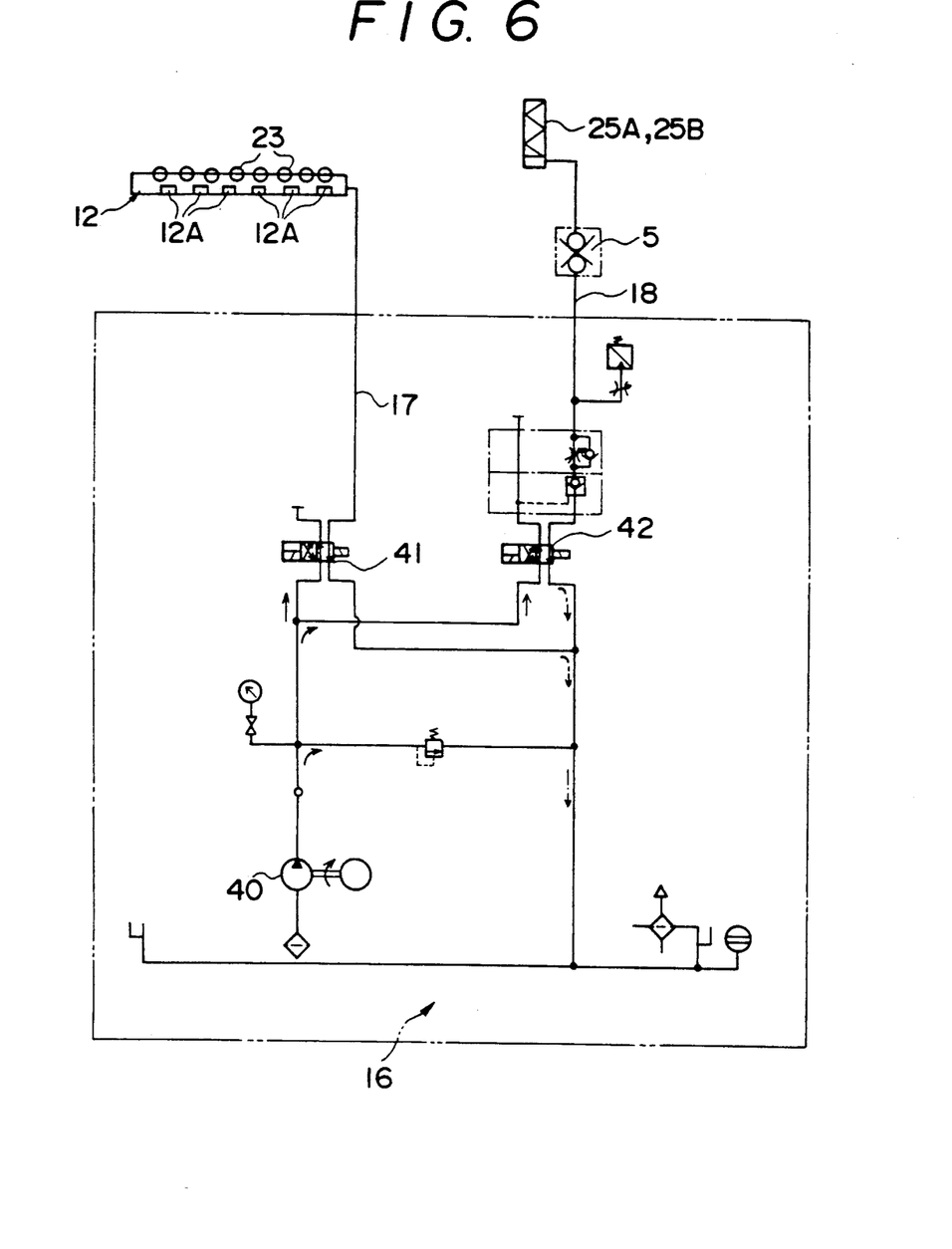
FIG. 6 is a diagram showing a hydraulic circuit of the press tool interchanging apparatus according to the present invention.

These feeding operations of the pressure coil are remotely controlled by means of an oil pressure pump 40 and solenoid valves 41 and 42 (as better seen in FIG. 6). Incidentally, the pressure application is indicated by solid arrows, and the pressure relief is indicated by broken arrows.

The aforementioned object can be wholly achieved by putting the present invention into practice. In short, the interchange of press tools can be safely accomplished for a shorter time since the connections of coil conduits are not manual but automatic by means of the couplers.

What is claimed is:

1. A press tool interchanging apparatus for a press machine, comprising: a tool plate arranged in a press station and including a plurality of tool clamps hydraulically actuated for clamping a press tool; a bolster plate underlying said tool plate and having a plurality of rollers adapted to appear, when lifted, above the upper surface of said bolster plate for carrying said press tool; a plurality of lifters arranged in said bolster plate and hydraulically actuated for lifting said rollers; and a plurality of pressure fluid conduits arranged in said tool plate for feeding a fluid under pressure to said tool clamps and said lifters.

2. A press tool interchanging apparatus according to claim 1, further comprising: a shunting station arranged on at least one side of said press station for shunting said press tool; tool transfer means for reciprocating said tool plate carrying said press tool to transfer the same between said shunting station and said press station; means for actuating said tool clamps and said lifters hydraulically; and a plurality of couplers mounted in predetermined positions on said bolster plate for coupling said pressure fluid conduits.

* * * * *